United States Patent
Yang

[11] Patent Number: 6,139,372
[45] Date of Patent: Oct. 31, 2000

[54] ELECTRICAL CONNECTOR

[75] Inventor: George Yang, Shih-Lin District, Taiwan

[73] Assignee: All Best Electronics Co., Ltd., Taipei, Taiwan

[21] Appl. No.: 09/222,018

[22] Filed: Dec. 30, 1998

[51] Int. Cl.[7] .................................................. H01R 13/502
[52] U.S. Cl. ............................................ 439/701; 439/660
[58] Field of Search ..................................... 439/701, 660, 439/752, 733.1, 686, 695

[56] References Cited

U.S. PATENT DOCUMENTS 5,980,325  11/1999  Horchler .................................. 439/660

*Primary Examiner*—Lincoln Donovan
*Assistant Examiner*—Eugene G. Byrd
*Attorney, Agent, or Firm*—Pro-Techtor International Services

[57] ABSTRACT

Disclosed is a connector mainly including a plastic body, a front steel case, and an insertion body assembled to a rear end of the plastic body. The insertion body is provided at top and bottom front surfaces with terminal slots corresponding to upper and lower rows of insertion terminals provided at a front end surface of the insertion terminals. Partitioning ribs are provided between rear ends of adjacent terminal slots and separating strips are provided at a rear end of the insertion body corresponding to the partitioning ribs with a receiving recess transversely extending between the corresponding ribs and strips. Interconnecting cables are connected to a rear end of the connector and each includes multiple conductors that are spacedly arranged corresponding to the insertion terminals and fixed in place by clamping them between a set of clamping pieces that are then set in the receiving recesses with bared front ends of the conductors projecting from the clamping pieces into the terminal slots to contact rear ends of the insertion terminals in the terminal slots between the partitioning ribs. The bared conductors and the insertion terminals can then be electrically connected by thermal welding at a time.

2 Claims, 7 Drawing Sheets

6,139,372

ELECTRICAL CONNECTOR

BACKGROUND OF THE INVENTION

The present invention relates to an improvement made to a connector, and more particularly to a connector that can be quickly manufactured and assembled and no short circuit would occur at junctures thereof.

Most of the connectors currently widely used with computers and/or video products include a steel case and a plastic body. The steel case houses a front part of the plastic body. Upper and lower rows of insertion terminals are provided to project from a front end surface of the plastic body. Rear ends of these insertion terminals are individually connected to corresponding leads in a whole bundle of interconnecting conductors by soldering. This type of connector is difficult to manufacture due to the inconvenient and time-consuming soldering operation for individual insertion terminals. When such type of connector is to be used with a desktop computer, it usually has a volume big enough for it to be manufactured without too much difficulty. However, when it is to be used with a notebook computer, LCD, etc., it must have a reduced volume that would inevitably cause difficulty in soldering individual leads to insertion terminals. Much more time is needed for soldering while short circuit might very possibly occur at soldered joints.

FIG. 1 is a disassembled sectional view of a conventional connector. As shown, the conventional connector includes a steel case 1 and a plastic body 2 that engage with each other. The steel case 1 houses a front part of the plastic body 2. Upper and lower rows of insertion terminals 21 are alternately provided at a front end surface of the plastic body 2. Rear ends of these insertion terminals 21 are individually connected to corresponding leads 22 in a whole bundle of interconnecting conductors by soldering. Each of the leads 22 is provided at outer surface with a movable insulating sleeve 23 which can be pushed forward along the lead 22 to locate around and cover a rear end of a corresponding insertion terminal 21 after the soldering operation. As mentioned above, the soldering of the leads 22 to the insertion terminals 21 is difficult and solder balls among the leads 22 tend to melt and cause short circuit. Therefore, this type of conventionally structured connector not only has production problem of time-consumed manufacture but also quality problem of possible short circuit at soldered joints.

To solve the shortcoming existed in the above-described conventional connector, another type of connector including an interconnecting PC board is developed. FIG. 2 is an exploded perspective view of this second type of conventional connector. Apart from the steel case 1 and the plastic body 2, the connector further includes a PC board 3. The plastic body 2 of this second type of conventional connector has two symmetrically rearward extended side walls 24. A guiding rail 25 having a retaining hole 26 is formed at an inner surface of each side wall 24. The PC board 3 has two rows of junctures 31 separately printed on top and bottom front surfaces thereof at positions corresponding to insertion terminals 21 provided on the plastic body 2. The PC board 3 is also provided on a top rear surface with a socket 32 corresponding to and electrically connected to the junctures 31, and at two lateral side surfaces with a protrusion 34 each. The PC board 3 can be fixedly assembled to the plastic body 2 by sliding forward along the guiding rails 25 at two sides of the plastic body 2 and engaging the protrusions 34 into the retaining holes 26. When the PC board 3 is fully inserted into the plastic body 2, rear ends of the insertion terminals 21 contact with and electrically connect to their respective corresponding junctures 31. The insertion terminals 21 and the junctures 31 are then soldered together. A commercially available flat cable 33 may be plugged into the socket 32.

This second type of conventional connector needs an additional socket 32 and therefore higher manufacturing cost. Moreover, the connector provides less better signal transmission efficiency because signals are transmitted from the rear ends of the insertion terminals via the PC board 3. Meanwhile, the connector occupies an increased volume.

SUMMARY OF THE INVENTION

It is therefore a primary object of the present invention to provide an improved connector having an insertion body to enable quick manufacture and avoid short circuit at individually soldered joints.

To achieve the above and other objects, the connector of the present invention mainly includes a steel case, a plastic body, and an insertion body. The steel case houses a front part of the plastic body and the insertion body is assembled to the plastic body by inserting it to a rear end of the plastic body. Upper and lower rows of alternately arranged insertion terminals are provided at a front end surface of the plastic body. The plastic body has two rearward extended side walls each of which has a guiding rail formed at an inner surface thereof. And a retaining hole is formed in each guiding rail at suitable position. The insertion body is formed on top and bottom front surfaces with a plurality of terminal slots corresponding to the insertion terminals on the plastic body and on two lateral side surfaces with two protrusions corresponding to the retaining holes in the guiding rails of the plastic body. When the insertion body is assembled to the rear end of the plastic body via the two guiding rails, rear ends of the insertion terminals are inserted into their respective corresponding terminal slots on the insertion body. The connector of the present invention is characterized in that:

partitioning ribs are provided between rear ends of adjacent terminal slots and separating strips are provided at a rear end of the insertion body corresponding to the partitioning ribs with a receiving recess transversely extending between the corresponding ribs and strips; and interconnecting cables are connected to a rear end of the connector and each includes multiple conductors that are spacedly arranged corresponding to the insertion terminals and fixed in place by clamping them between a set of clamping pieces that are then set in the receiving recesses with bared front ends of the conductors projecting from the clamping pieces into the terminal slots to contact rear ends of the insertion terminals in the terminal slots between the partitioning ribs. The bared conductors and the insertion terminals can then be electrically connected by thermal welding.

BRIEF DESCRIPTION OF THE DRAWINGS

The above and other objects as well as the features of the present invention can be best understood by referring to the following detailed description of the preferred embodiments and the accompanying drawings wherein.

DETAILED DESCRIPTION OF THE PREFERRED EMBODIMENTS

Figure 1:
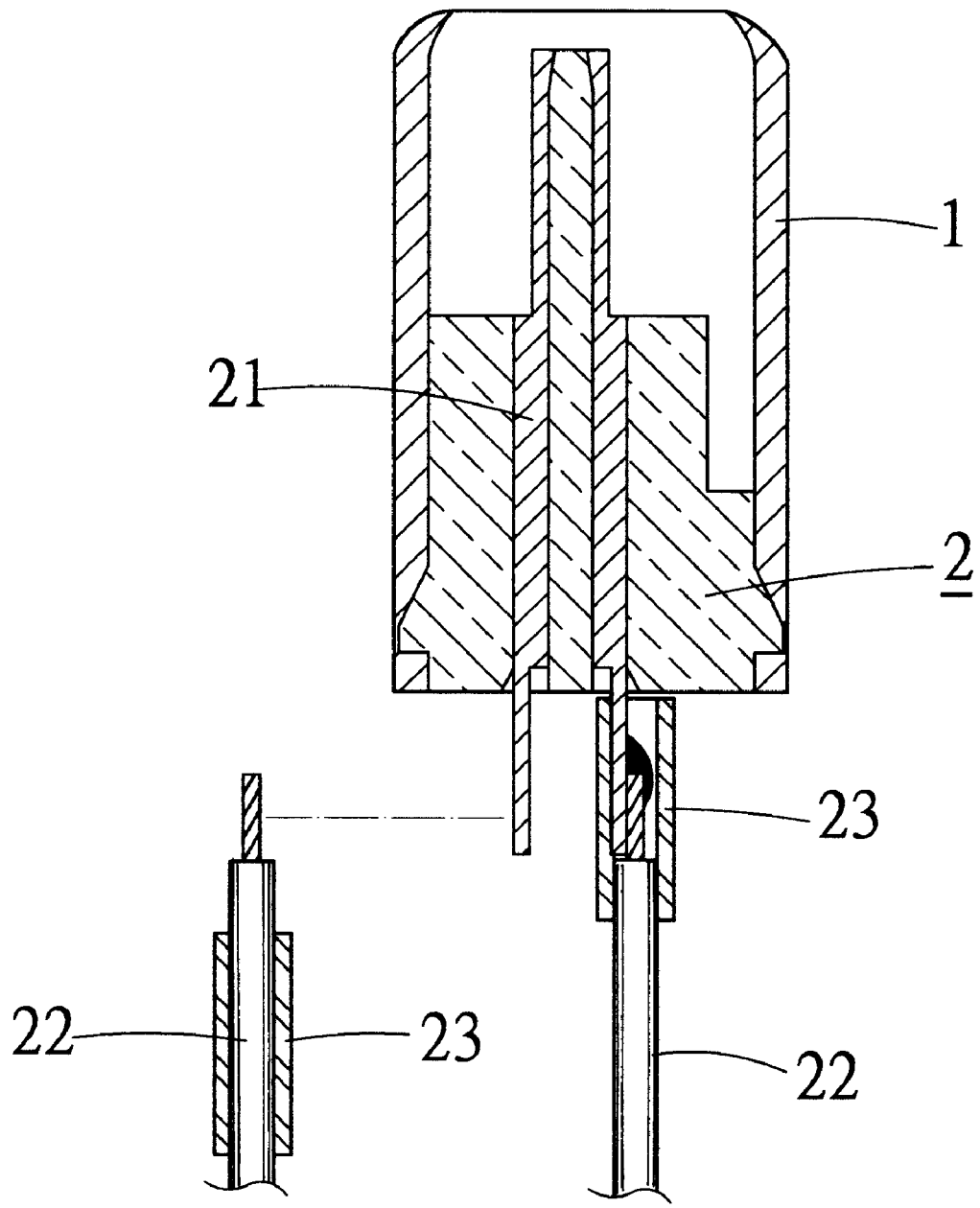
FIG. 1 is a disassembled sectional view of a conventional connector.
Figure 2:
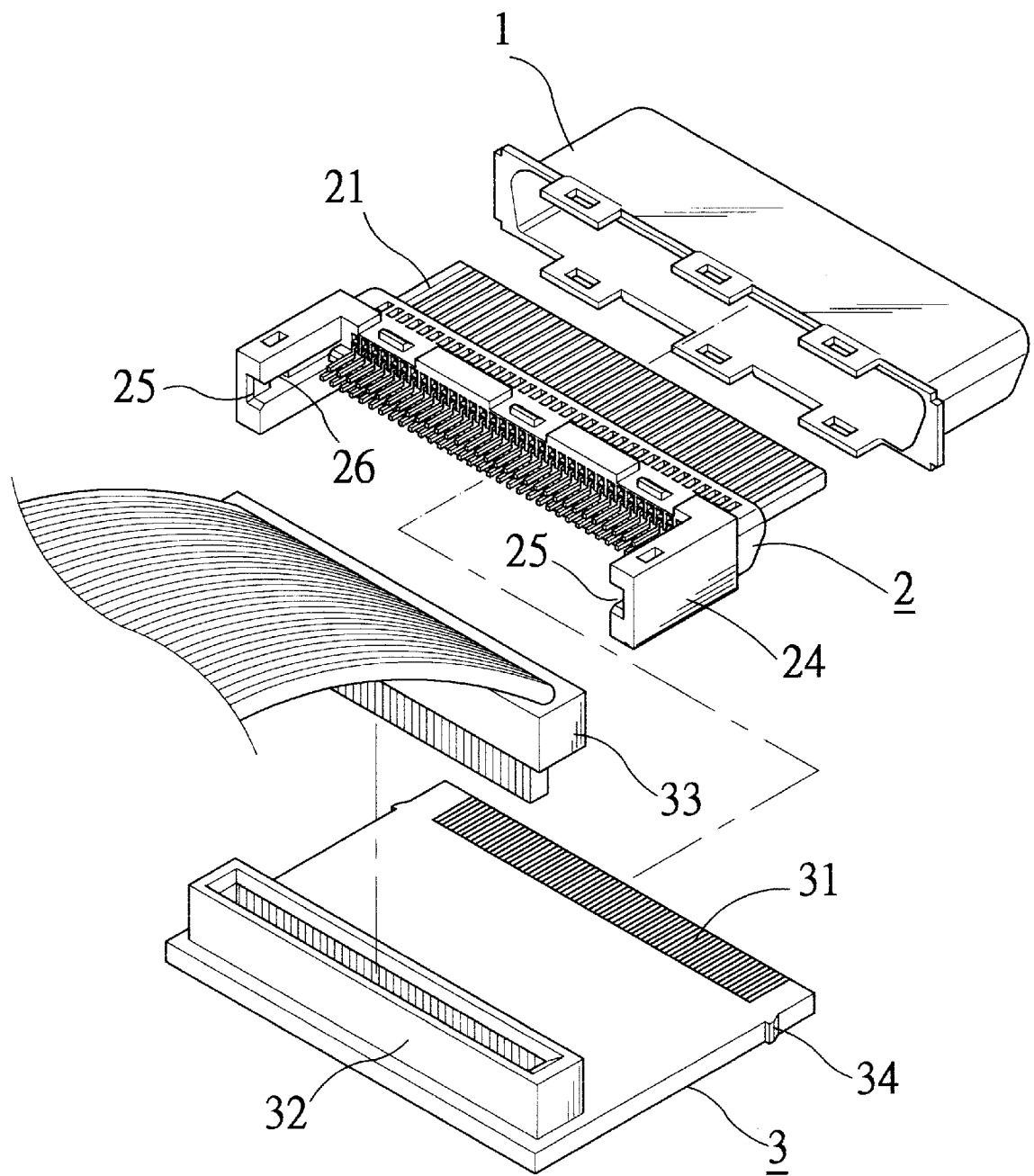
FIG. 2 is an exploded perspective view of another conventional connector.
Figure 3:
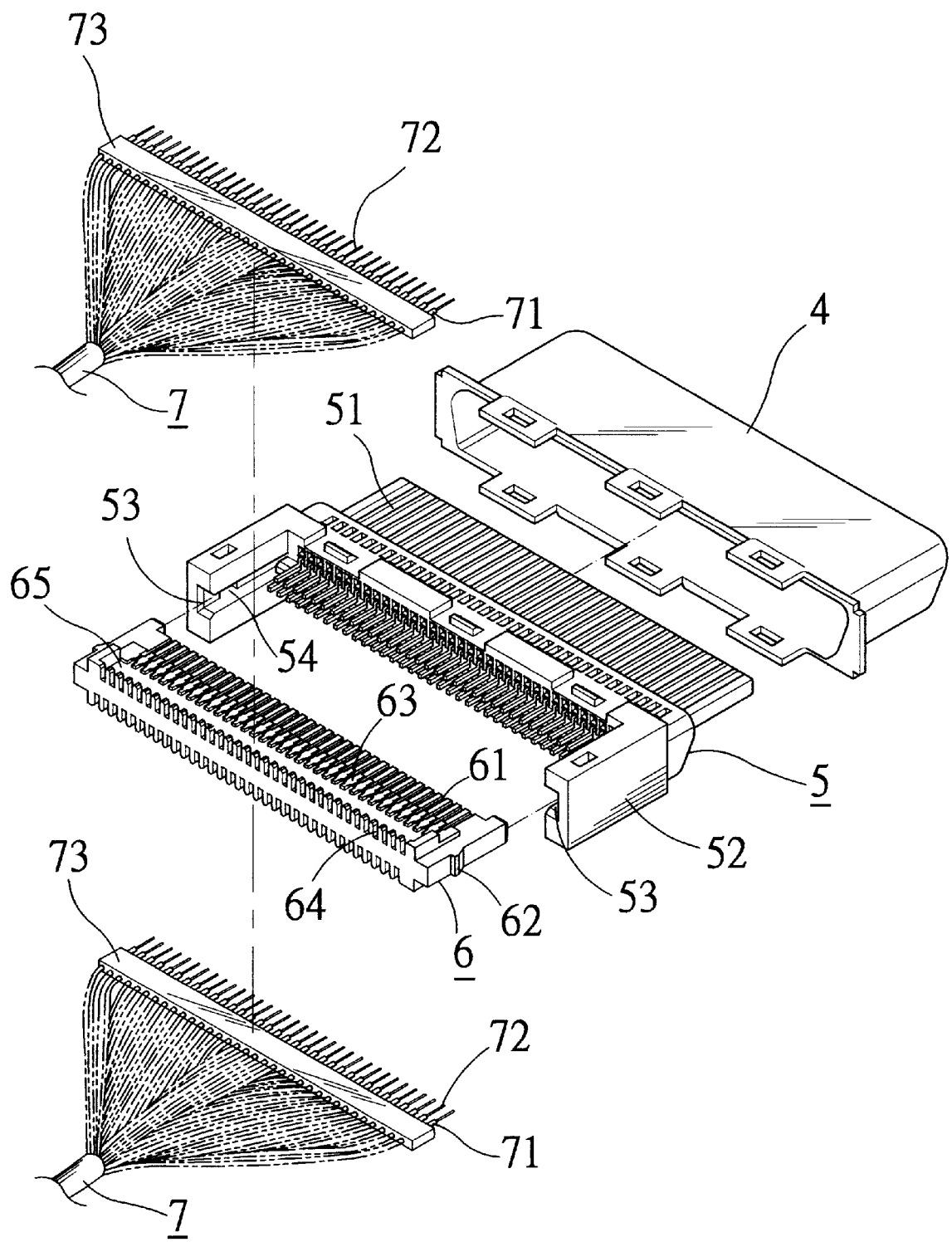
FIG. 3 is an exploded perspective view of a connector according to the present invention.
Figure 4:
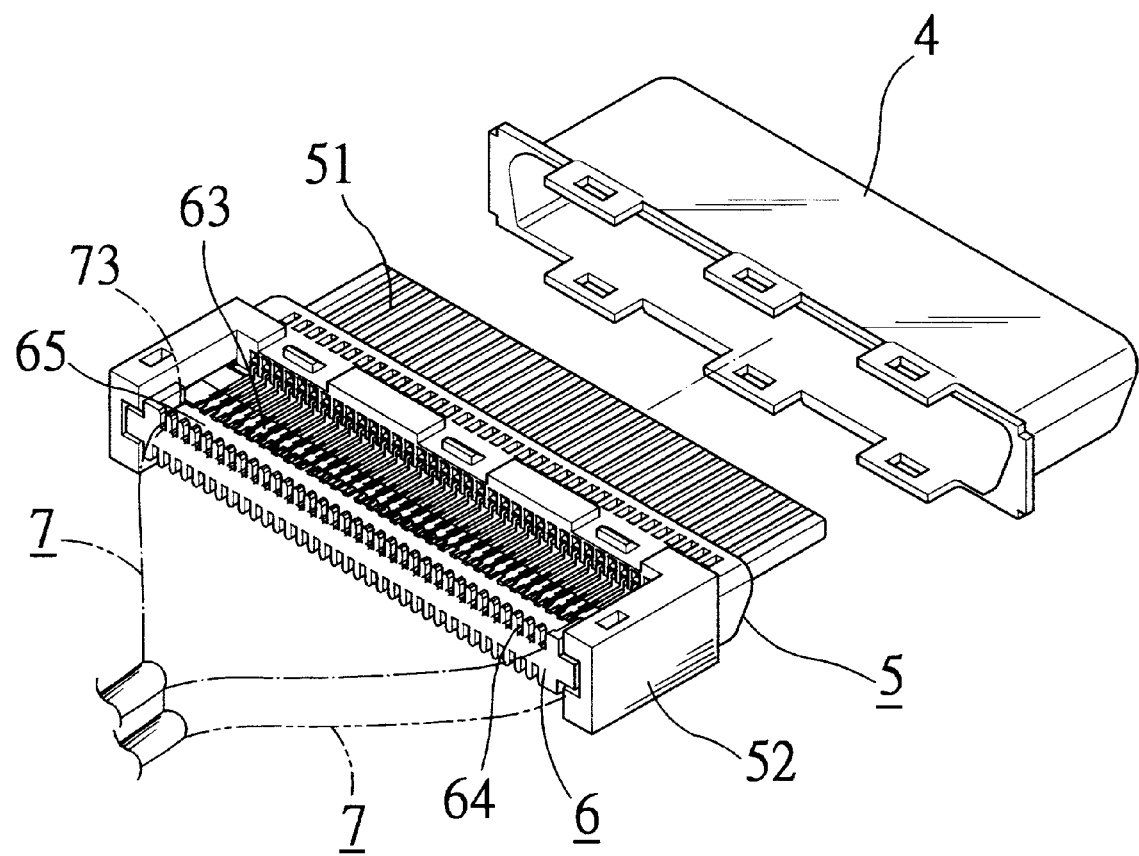
FIG. 4 is an assembled perspective view of the connector of FIG. 3.

Please refer to FIGS. 3 and 4 that are exploded and assembled perspective views, respectively, of an improved connector according to the present invention. As shown, the connector mainly includes a steel case 4, a plastic body 5, and an insertion body 6. The steel case 4 houses a front part of the plastic body 5 and the insertion body 6 is assembled to a rear end of the plastic body 5.

The plastic body 5 includes an upper and a lower row of alternately arranged insertion terminals 51 projected from a front end surface thereof and two rearward extended side walls 52. Each of the side walls 52 is formed at an inner surface with a guiding rail 53 that is further formed at a suitable position with a retaining hole 54.

The insertion body 6 is formed at two lateral side surfaces with two protrusions 62 for engaging into the retaining holes 54 in the guiding rails 53 of the plastic body 5 when the insertion body 6 is assembled to the plastic body 5 by sliding it forward along the two guiding rails 53. The insertion body 6 is formed at top and bottom front surfaces with two rows of terminal slots 61 corresponding to the insertion terminals 51. When the insertion body 6 is assembled to the rear end of the plastic body 5, rear ends of the insertion terminals 51 shall locate in their respective corresponding terminal slots 61. Moreover, rear ends of the terminal slots 61 on the insertion body 6 are separated from one another by partitioning ribs 63 respectively located between two adjacent terminal slots 61. And, a plurality of separating strips 64 are provided along a rear end of the insertion body 6 to vertically projected from top and bottom rear surfaces of the insertion body 6 and correspond to the partitioning ribs 63. A transverse space is left on top and bottom surfaces of the insertion body 6 between the rows of correspondingly arranged partitioning ribs 63 and separating strips 64 to serve as a receiving recess 65.

Figure 5:
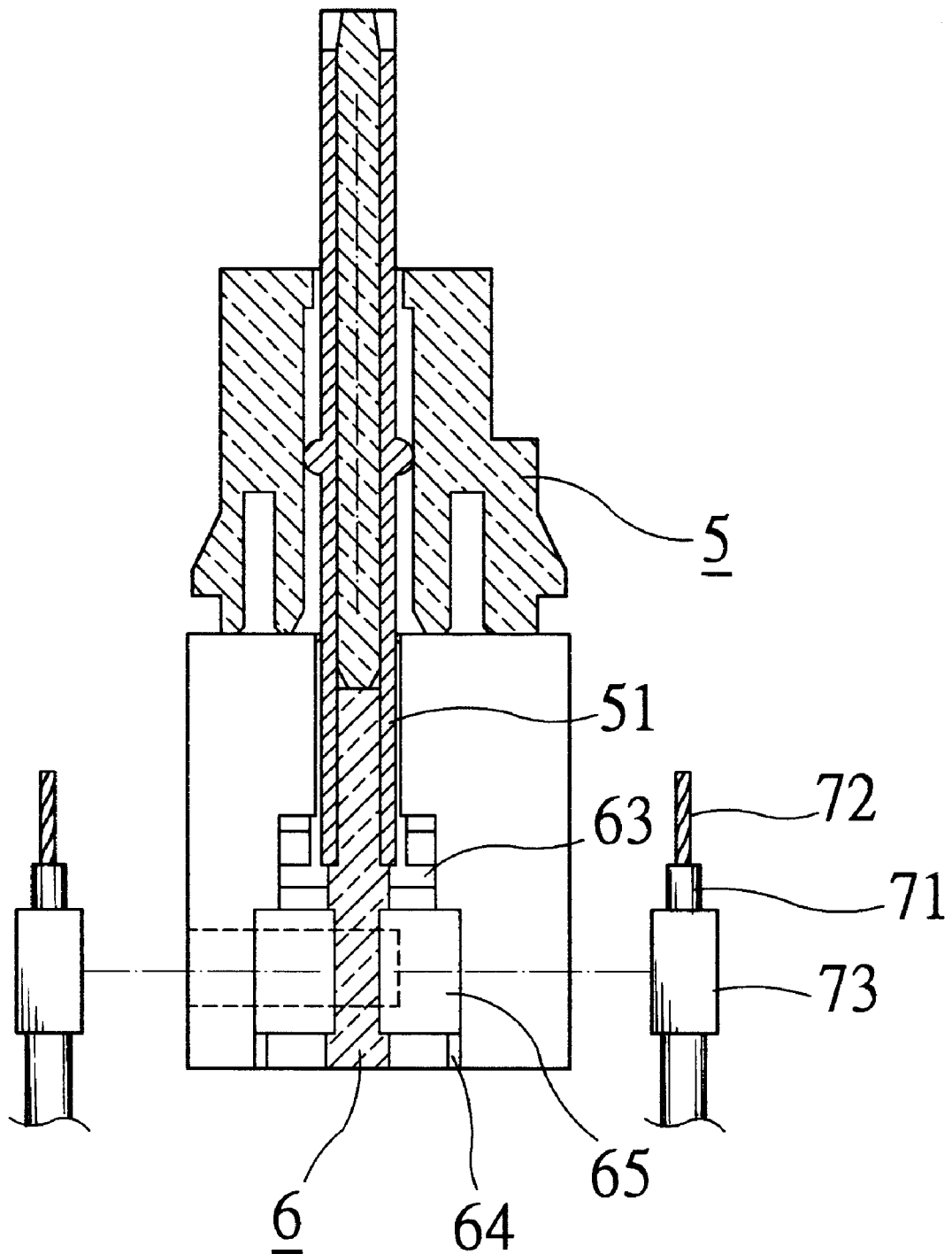
FIG. 5 is a side sectional view showing the insertion body and the plastic body of the present invention in a non-connection state.

Interconnecting cables 7 each having multiple conductors 71 are connected to a rear end of the connector. The conductors 71 are arranged in advance to separately correspond to the insertion terminals 51 and are fixed in place by clamping them between a set of transversely extended clamping pieces 73, such that the conductors 71 are equally spaced and extend a suitable length from a front side of the clamping pieces 73. Front ends of the conductors 71 extended from the clamping pieces 73 are stripped to become equally spaced bare conductors 72. The clamping pieces 73 with conductors 71 clamped therebetween are then set in the receiving recesses 65, as illustrated in FIG. 5, permitting portions of the conductors 71 immediately behind the clamping pieces 73 to separately locate between two adjacent separating strips 64 while the bare conductors 72 press on and contact rear ends of corresponding insertion terminals 51 that are located in the terminal slots 61. The rear ends of the insertion terminals 51 and the bare conductors 72 are then connected together by way of thermal welding to form an electrically connected state.

Figure 6:
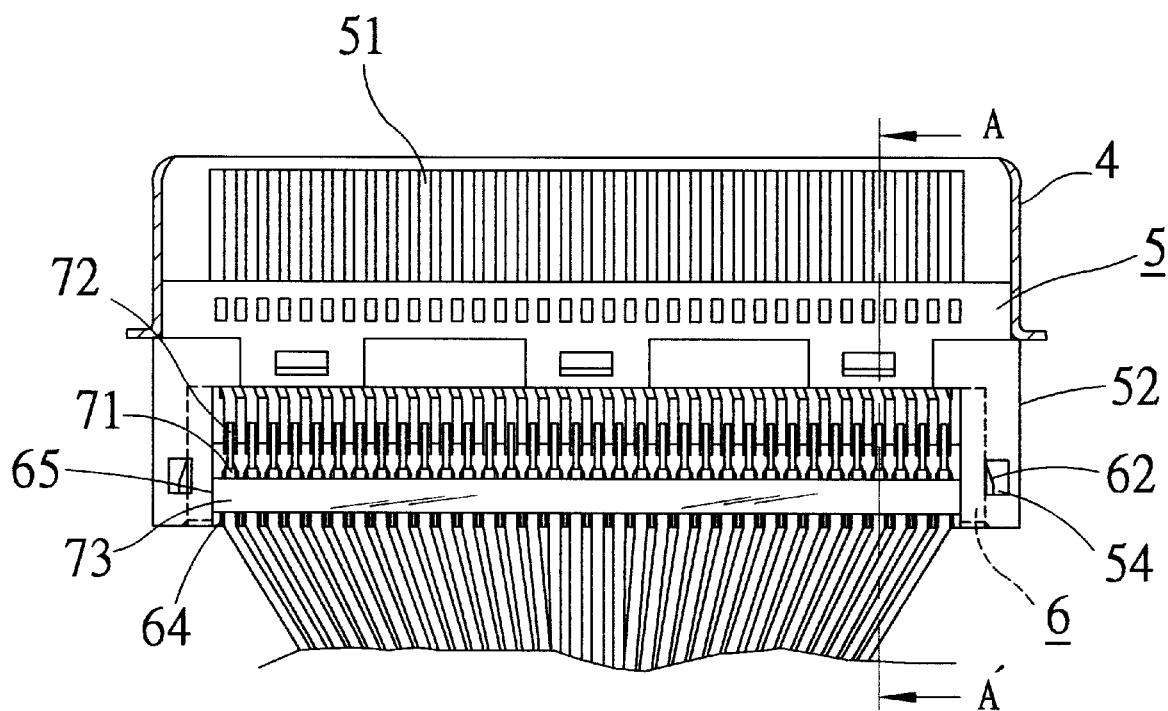
FIG. 6 is a partially sectional top view of the connector of FIG. 4 in an assembled state.
Figure 7:
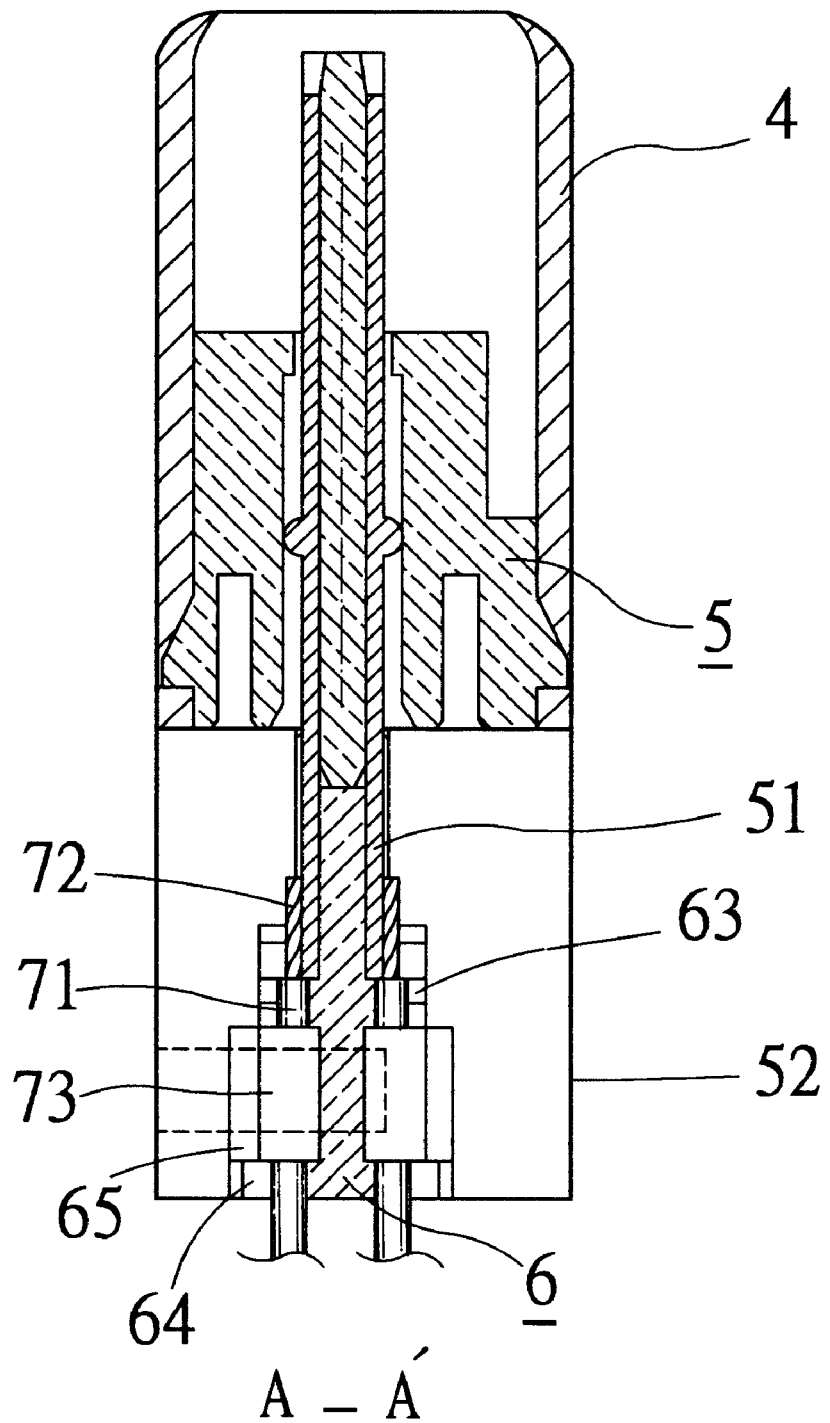
FIG. 7 is a sectional view taken on line A—A of FIG. 6.

Please refer to FIG. 6 that is a partially sectional top view of the present invention and FIG. 7 that is a sectional view taken on line A-A of FIG. 6. As shown, the insertion body 6 is first assembled to the plastic body 5 by inserting it into the guiding rails 53 before the thermal welding can be performed. After the insertion body 6 is assembled to the plastic body 5, the rear end of each insertion terminal 51 will locate in one terminal slot 61 between two adjacent partitioning ribs 63 while the bare conductor 72 at the front end of each conductor 71 projects into one terminal slot 61 to press on and contact the rear end of a corresponding insertion terminal 51. This arrangement facilitates the thermal welding of the bare conductors 72 to the insertion terminals 51 at a time.

Following are some advantages of the above-described specially structured connector according to the present invention:

1. By setting the clamping pieces 73 in the receiving recesses 65 of the insertion body 6, the bare conductors 72 at front ends of the conductors 71 are equally spaced and contact rear ends of their respective corresponding insertion terminals 51. This condition allows easy implementation of thermal welding to electrically connect the bare conductors 72 to the insertion terminals 51 without the need to individually solder them together. In other words, the connector of the present invention can be conveniently and quickly manufactured and assembled.

2. The position of conductors 71 relative to one another is fixed by the clamping pieces 73 without shifting easily and therefore avoids short circuit possibly occur at welded joints. In other words, quality of the produced connectors can be more easily controlled.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A connector comprising a plastic body, a steel case housing a front part of said plastic body, an insertion body assembled to a rear end of said plastic body, and interconnecting cables connected to a rear end of said connector;

said plastic body being provided at a front end surface with upper and lower rows of alternately arranged insertion terminals and at two lateral sides with two rearward extended side walls that are formed at respective inner surfaces, said side walls include a guiding rail having a retaining hole;

said insertion body being provided with two rows of terminal slots corresponding to said insertion terminals on said plastic body and at two lateral sides with protrusions corresponding to said retaining holes in said guiding rails of said plastic body; said insertion body also being provided between adjacent rear ends of said terminal slots with partitioning ribs, at a rear end of said insertion body with a plurality of vertically projected separating strips corresponding to said partitioning ribs, and on top and bottom surfaces between said partitioning ribs and said separating strips with transverse receiving recesses, such that when said insertion body is assembled to a rear end of said plastic body, rear ends of said insertion terminals extend into corresponding terminal slots; and each of said interconnecting cables including a round main body containing multiple conductors that are spread and arranged at terminal ends of said interconnecting cables, said conductors corresponding to said insertion terminals and clamped in place between a set of transversely extended clamping pieces, such that front ends of said conductors are equally spaced and project forward from a front side of said clamping pieces with a length thereof stripped to provide bare conductors, and said clamping pieces being received in said receiving recesses of said insertion body with front ends of said conductors locating in corresponding terminal slots and said bare conductors locating on and contacting rear ends of said insertion terminals in the terminal slots;

whereby when said insertion body with said interconnecting cables connected thereto is assembled to the rear end of said plastic body by sliding said insertion body into said guiding rails, said bare conductors of said interconnecting cables are received in said terminal slots and are separated by said partitioning ribs such that said bare conductors can be electrically connected to said insertion terminals by thermal welding.

2. A connector as claimed in claim 1, wherein said rear ends of said insertion terminals are located in said terminal slots between said partitioning ribs.

* * * * *